(12) United States Patent
Fujimori et al.

(10) Patent No.: US 6,894,745 B2
(45) Date of Patent: May 17, 2005

(54) LIQUID CRYSTAL DISPLAY DEVICE WITH A LIGHT DIFFUSION LAYER IN THE REFLECTION REGION ALONE

(75) Inventors: Koichi Fujimori, Mie (JP); Masumi Kubo, Nara (JP); Yozo Narutaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 446 days.

(21) Appl. No.: 09/759,334

(22) Filed: Jan. 16, 2001

(65) Prior Publication Data

US 2001/0008437 A1 Jul. 19, 2001

(30) Foreign Application Priority Data

Jan. 18, 2000 (JP) ........................................ 2000-008769
Nov. 29, 2000 (JP) ........................................ 2000-362208

(51) Int. Cl.[7] .......................................... G02F 1/1335
(52) U.S. Cl. ....................................... 349/113; 349/112
(58) Field of Search ................................. 349/112, 113, 349/114, 65, 61, 64

(56) References Cited

U.S. PATENT DOCUMENTS

| 5,641,974 A | * | 6/1997 | den Boer et al. | ............. 257/59 |
| 5,796,455 A | | 8/1998 | Mizobata et al. | ............ 349/116 |
| 5,963,284 A | * | 10/1999 | Jones et al. | ................. 349/112 |
| 6,008,871 A | * | 12/1999 | Okumura | ..................... 349/61 |
| 6,195,140 B1 | | 2/2001 | Kubo et al. | |
| 6,493,051 B2 | * | 12/2002 | Ha et al. | ..................... 349/113 |

FOREIGN PATENT DOCUMENTS

| JP | 9-230345 | 9/1997 |
| JP | 11-101992 | 4/1999 |
| JP | 11-242226 | 9/1999 |
| JP | 2000-19563 | 1/2000 |

* cited by examiner

Primary Examiner—Tarifur R. Chowdhury
Assistant Examiner—P. R. Akkapeddi
(74) Attorney, Agent, or Firm—Nixon & Vanderhye P.C.

(57) ABSTRACT

Each pixel region includes a transmission region for display in a transmission mode using light entering through a first substrate and a reflection region for display in a reflection mode using light entering through a second substrate. The first substrate includes a transparent electrode region and a reflection electrode region, both of which have flat surfaces facing a liquid crystal layer. The second substrate includes a transparent electrode in the reflection region and the transmission region on its surface facing the liquid crystal layer and includes a light diffusion layer in the reflection region, and the surface facing the liquid crystal layer is flat in the transmission region and the reflection region.

25 Claims, 13 Drawing Sheets

LIQUID CRYSTAL DISPLAY DEVICE WITH A LIGHT DIFFUSION LAYER IN THE REFLECTION REGION ALONE

BACKGROUND OF THE INVENTION

The present invention relates to a liquid crystal display device, and more particularly, it relates to a transmission/reflection type liquid crystal display device capable of display in both a transmission mode and a reflection mode.

Owing to their characteristics such as a small thickness and small power consumption, liquid crystal display devices are recently widely used in OA equipment such as a word processor and a personal computer, portable information equipment such as an electronic notebook and a camera-integrated VTR equipped with a liquid crystal monitor.

The liquid crystal display devices are divided roughly into two types: reflection type and transmission type. A liquid crystal display device is not a spontaneously luminous display device like a CRT (cathode-ray tube) and EL (electroluminescence), but light of a lighting device disposed behind a liquid crystal display panel (known as the so-called back light) is used for display in a transmission type liquid crystal display device and ambient light is used for display in a reflection type liquid crystal display device.

Since a transmission type liquid crystal display displays an image by using light from a back light, it can advantageously display bright images with a high contrast ratio without being affected by ambient brightness but disadvantageously consumes large power due to the back light included therein. A back light consumes approximately 50% or more of the power consumption in a general transmission type liquid crystal display device. Furthermore, in a very bright environment (for example, in the open air in fine weather), the visibility is degraded or the power consumption is further increased when the brightness of the back light is increased to attain sufficient visibility.

On the other hand, since a reflection type liquid crystal display device does not include a back light, it advantageously consumes very small power, but the brightness and the contrast ratio of display are disadvantageously largely affected by the environment such as ambient brightness. In particular, in a dark environment, the visibility is excessively degraded.

For the purpose of overcoming these problems, a liquid crystal display device having a function to display images in both the reflection mode and the transmission mode is disclosed in, for example, Japanese Laid-Open Patent Publication No. 11-101992.

This transmission/reflection type liquid crystal display device includes, in every pixel region, a reflection pixel electrode for reflecting ambient light and a transmission pixel electrode for transmitting light from a back light, so that images can be displayed with the mode switched between the transmission mode and the reflection mode or in the both modes. Accordingly, the transmission/reflection type liquid crystal display device has both the characteristic of a reflection type liquid crystal display device, that is, the small power consumption, and the characteristic of a transmission type liquid crystal display device, that is, bright display with a high contrast ratio minimally affected by ambient brightness. Moreover, the disadvantage of a transmission type liquid crystal display device that the visibility is degraded in a very bright environment (for example, in the open air in fine weather) can be suppressed.

The transmission/reflection type liquid crystal display device disclosed in Japanese Laid-Open Patent Publication No. 11-101992, however, has irregularities of the surface profile of the reflection electrode for increasing the brightness of display in the reflection mode (as is understood from, for example, FIGS. 6 and 9 of the publication). Accordingly, the thickness of a liquid crystal layer is largely varied in a reflection region, and hence, it is difficult to realize optimal display. Furthermore, it is necessary to precisely control the shape of the irregularities (convexes/concaves) for preventing light interference caused by the irregularities, which disadvantageously increases the fabrication cost.

SUMMARY OF THE INVENTION

An object of the invention is providing a transmission/reflection type liquid crystal display device capable of realizing high quality display in which the thickness of a liquid crystal layer, in a reflection region in particular, can be precisely controlled.

The object is achieved by the following liquid crystal display device. The liquid crystal display device of this invention includes a first substrate; a second substrate; a liquid crystal layer disposed between the first substrate and the second substrate; and a plurality of pixel regions for display, and each of the plurality of pixel regions includes a transmission region for display in a transmission mode using light entering through the first substrate and a reflection region for display in a reflection mode using light entering through the second substrate, the first substrate includes, on a surface thereof facing the liquid crystal layer, a transparent electrode region defining the transmission region and a reflection electrode region defining the reflection region, and each surface facing the liquid crystal layer of the transparent electrode region and the reflection electrode region of the first substrate are flat, and the second substrate includes a light diffusion layer in the reflection region and includes, on a surface thereof facing the liquid crystal layer, a transparent electrode in the reflection region and the transmission region, and the surface thereof facing the liquid crystal layer is flat in the transmission region and the reflection region.

The first substrate (a substrate disposed on a side closer to a back light, such as an active matrix substrate) and the second substrate (a substrate disposed on a side closer to an observer, such as a color filter substrate) included in the present liquid crystal display device have flat surfaces facing the liquid crystal layer in the reflection region and the transmission region, and hence, the liquid crystal layer has a constant thickness in each of the reflection region and the transmission region. Accordingly, the thicknesses of the liquid crystal layer in the reflection region and the transmission region can be set optimally to the respective display modes. The light diffusion layer provided on the second substrate in the reflection region diffuses light entering the reflection region, so as to realize paper white display.

The word "being flat" herein means a surface state for making the thickness of the liquid crystal layer uniform so as not to cause degradation in display quality derived from variation in the thickness of the liquid crystal layer. Specifically, when roughness (for example, an average value of height differences of the irregularities measured with a surface roughness meter) of a surface in a given region is smaller than $1/10$ of the thickness of the liquid crystal layer in the region, the surface can be regarded as being flat. A flat surface is not always a mirror surface.

The second substrate may include the light diffusion layer also in the transmission region, or the second substrate may include the light diffusion layer in the reflection region alone. When the light diffusion layer is formed in the transmission region of the second substrate, light passing through the transmission region is diffused so as to suppress surface reflection in the transmission region of the liquid crystal display device. As a result, display free from unevenness and glare can be realized. In other words, a portion of the light diffusion layer formed in the transmission region exhibits the so-called anti-glare effect. On the other hand, when the light diffusion layer is not formed in the transmission region, the optical efficiency can be improved in the transmission region. It can be appropriately determined depending upon the application of the liquid crystal display device which configuration is employed.

The second substrate may include a transparent substrate, and the light diffusion layer may be provided on a surface of the transparent substrate facing the liquid crystal layer or formed on a surface of the transparent substrate closer to an observer (namely, on a surface not facing the liquid crystal layer). It can be appropriately determined which configuration is employed depending upon the application of the liquid crystal display device in consideration of advantages and disadvantages of the respective configurations described below.

In the configuration where the light diffusion layer is provided on the surface facing the liquid crystal layer, blur (unclearness of contours) of a displayed image is advantageously minimally caused, but the fabrication process is complicated and the cost is increased. In the configuration where the light diffusion layer is selectively formed in the reflection region, when the pitch of patterns of disposing the light diffusion layer is close to the pixel pitch, there arises a problem that interference of light (moiré) is easily caused. This problem is conspicuous in a highly refined liquid crystal display device.

On the other hand, the configuration where the light diffusion layer is provided on the surface closer to an observer can be advantageously easily fabricated, easily applied to design change or common use of the light diffusion layer and fabricated at low cost, but blur of a displayed image tends to be caused. In order to suppress blur of a displayed image, a thinner substrate is preferred. A problem of double image due to the thickness of the substrate is never caused in disposing the light diffusion layer on either surface of the substrate differently from a case of disposing a reflection layer. This is because the light diffusion layer does not directly reflect incident light differently from the reflection layer.

The liquid crystal display device may further include a polarizing plate provided on a surface of the second substrate closer to the observer, and when the light diffusion layer is provided on the surface closer to the observer, the light diffusion layer is preferably provided between the transparent substrate and the polarizing plate. When the light diffusion layer is provided between the transparent substrate and the polarizing plate, blur of a displayed image can be minimized. Furthermore, the light diffusion layer preferably functions as an adhesive layer for adhering the transparent substrate and the polarizing plate to each other. When an adhesive for adhering the polarizing plate onto the transparent substrate is formed from a material having a light diffusing function, the fabrication process can be simplified.

The light diffusion layer is preferably a dispersion type light diffusion layer containing a matrix material and particles having a refractive index different from that of the matrix material. When the light diffusion layer is formed from the material obtained by dispersing the particles in the matrix material, the light diffusion layer can be easily formed to have a flat surface as well as the thickness of the liquid crystal layer in the reflection region can be easily and accurately controlled.

The second substrate may include a transparent substrate and a color filter layer, and the color filter layer may function also as the light diffusion layer. When the matrix material where the particles with a different refractive index from the matrix material are dispersed is used for forming the color filter layer, the color filter layer can function also as the light diffusion layer, and thus, the fabrication process of the liquid crystal display device can be simplified.

The second substrate may include a plastic substrate, the plastic substrate may contain a matrix material and particles having a refractive index different from that of the matrix material, and the plastic substrate may function also as the light diffusion layer. When the matrix material where the particles with a different refractive index from the matrix material are dispersed is used for forming the plastic substrate, the plastic substrate can function also as the light diffusion layer, and thus, the fabrication process of the liquid crystal display device can be simplified.

A thickness of the liquid crystal layer in the reflection region is preferably about ½ of a thickness of the liquid crystal layer in the transmission region. In a liquid crystal display device operated in a display mode using polarization (hereinafter simply referred to as the polarization mode), when the thickness of the liquid crystal layer in the reflection region is ½ of the thickness of the liquid crystal layer in the transmission region, retardation of light passing through the reflection region can accord with retardation of light passing through the transmission region. Furthermore, the liquid crystal layer has a constant thickness in each region. As a result, high quality display can be realized.

The liquid crystal display device may further include an anti-glare layer provided on a surface of the second substrate closer to an observer. In the liquid crystal display device including the anti-glare layer on the surface of the second substrate closer to an observer, since the light diffusion layer is provided on the second substrate, light entering from the back light and passing through the transmission region and light entering from the side closer to the observer, reflected by the reflection electrode region and passing through the reflection region both pass through the light diffusion layer to be diffused by the light diffusion layer before going out toward the observer. Accordingly, moiré cause between irregularities of the anti-glare layer and the pixel regions, moiré caused between the irregularities of the anti-glare layer and the transmission regions and moiré caused between the irregularities of the anti-glare layer and the reflection regions are all suppressed, resulting in realizing display free from unevenness.

When the liquid crystal display device includes the anti-glare layer provided on the surface of the second substrate closer to an observer, the second substrate may include a transparent substrate, and the light diffusion layer is preferably provided between the transparent substrate and the anti-glare layer. When the light diffusion layer is provided between the transparent substrate and the anti-glare layer, the effect to suppress moiré is remarkably exhibited. When the liquid crystal display device further include a polarizing plate between the transparent substrate and the anti-glare layer, the light diffusion layer is preferably provided between the transparent substrate and the polarizing plate. When the light diffusion layer is provided between the transparent substrate and the polarizing plate, blur of a displayed image can be suppressed.

DETAILED DESCRIPTION OF THE PREFERRED EMBODIMENTS

Preferred embodiments of the invention will now be described with reference to the accompanying drawings. It is noted that the invention is not limited to the following embodiments.

Embodiment 1

In a liquid crystal display device of Embodiment 1, a light diffusion layer is disposed on the inside (on a side closer to a liquid crystal layer) of a second substrate (disposed on a side closer to an observer) opposing a first substrate (disposed on a side closer to a back light) with the liquid crystal layer sandwiched therebetween.

Figure 1A:
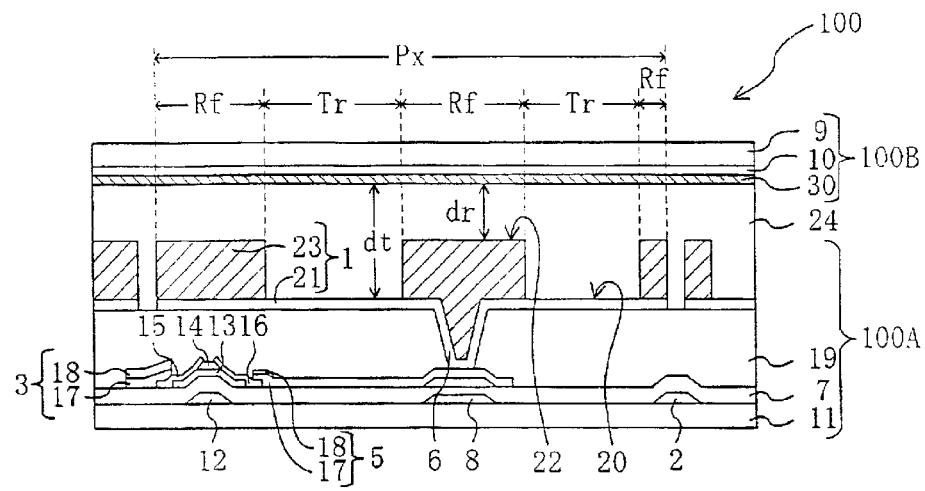
FIGS. 1A and 1B are schematic cross-sectional views of liquid crystal display devices 100 and 100' according to Embodiment 1 of the invention, respectively.
Figure 1B:
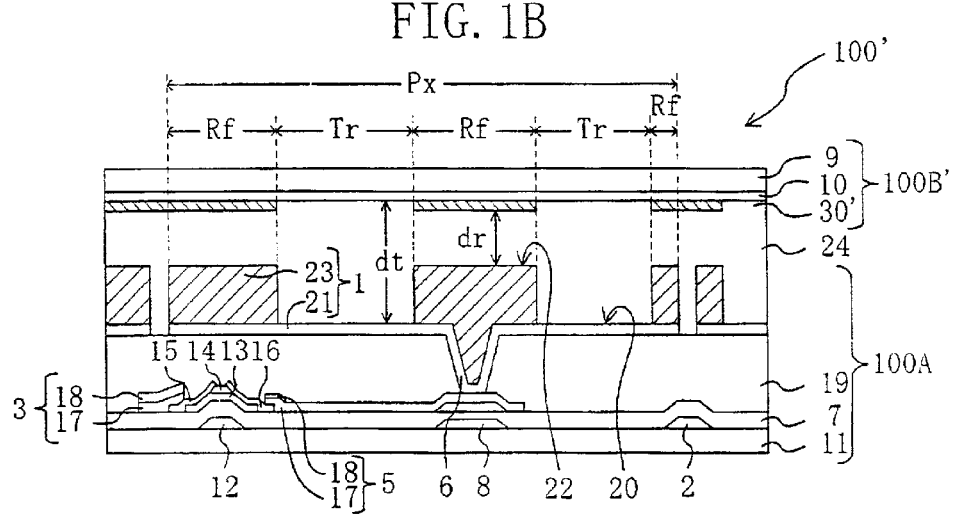

FIGS. 1A and 1B respectively show the schematic sectional structures of liquid crystal display devices 100 and 100' of this embodiment. FIGS. 1A and 1B are cross-sectional views of the liquid crystal display devices 100 and 100' of this embodiment, and FIG. 2 is a plan view of an active matrix substrate 100A used in the liquid crystal display devices 100 and 100'.

Each of the transmission/reflection type liquid crystal display devices 100 and 100' includes, as is shown in FIGS. 1A and 1B, a transmission region Tr and a reflection region Rf in each of plural pixel regions Px arranged in the form of a matrix, so as to display images in a transmission mode and a reflection mode. Images can be displayed in one of the transmission mode and the reflection mode or in both the modes. Typically, each of the liquid crystal display devices 100 and 100' includes a pair of polarizing plates (not shown) disposed in a parallel Nicols manner and a lighting device (back light) (not shown) disposed on the side of the active matrix substrate 100A. Each of FIGS. 1A and 1B shows one pixel region Px. The liquid crystal display device 100' shown in FIG. 1B is different from the liquid crystal display device 100 of FIG. 1A in the structure of a light diffusion layer 30.

As is shown in FIG. 1A, the liquid crystal display device 100 includes the active matrix substrate 100A, a counter substrate (also known as a "color filter substrate") 100B and a liquid crystal layer 24 sandwiched therebetween.

Figure 2:
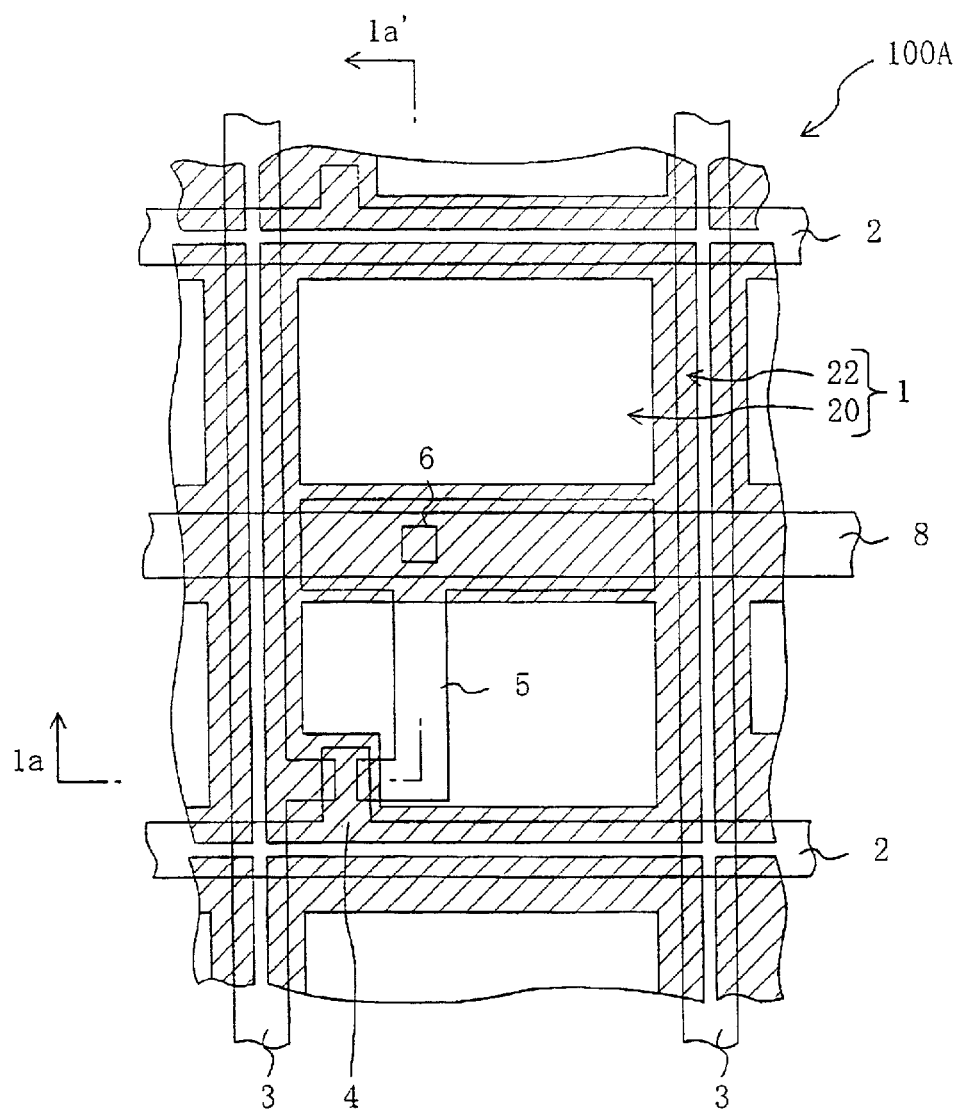
FIG. 2 is a schematic plan view of an active matrix substrate 100A included in the liquid crystal display devices 100 and 100' of Embodiment 1.

The active matrix substrate 100A includes, as is shown in FIG. 2, a transparent electrode region 20 for defining a transmission region Tr of the liquid crystal display device 100 and a reflection electrode region 22 for defining a reflection region Rf. One pixel region Px includes the transmission region Tr and the reflection region Rf, and one pixel electrode region 1 includes the transparent electrode region 20 and the reflection electrode region 22. The pixel electrode region 1, the transparent electrode region 20 and the reflection electrode region 22 are defined as regions of the active matrix substrate 100A, and the pixel region Px, the transmission region Tr and the reflection region Rf are defined as regions of the liquid crystal display device 100.

The transparent electrode region 20 includes a transparent electrode 21, and the reflection electrode region 22 includes a metal layer 23. The metal layer 23 is formed to be in contact with the transparent electrode 21, and is electrically connected to a drain electrode 16 of a TFT 4 through the transparent electrode 21 so as to function as a reflection electrode. In other words, the transparent electrode 21 and the metal layer 23 together function as a pixel electrode. The transparent electrode 21 is formed from a transparent conducting material such as ITO, and the metal layer 23 is formed from a metal having high reflectance such as Al.

In general, the metal layer 23 defining the reflection electrode region 22 is not necessarily electrically connected to the drain electrode 16, and the metal layer 23 itself does not necessarily function as the reflection electrode. For example, an insulating layer (not shown) may be disposed below the metal layer 23, so as to apply a voltage to the liquid crystal layer 24 within the reflection region Rf by using a separately formed transparent electrode.

As is shown in FIG. 1A, the active matrix substrate 100A includes a transparent insulating substrate 11 such as a glass substrate, and a gate line 2, a gate electrode 12 and an auxiliary capacitor electrode 8 are formed on the transparent substrate 11. The active matrix substrate 100A further includes agate insulating film 7 covering the gate line 2, the gate electrode 12 and the auxiliary capacitor electrode 8. On a portion of the gate insulating film 7 above the gate electrode 12, a semiconductor layer 13, a channel protection layer 14, a source electrode 15 and the drain electrode 16 are formed so as to together constitute the TFT 4. The source electrode 15 and the drain electrode 16 of the TFT 4 are electrically connected to a source line 3 and a connection electrode 5, respectively. Each of the source line 3 and the connection electrode 5 has a two-layer structure including a transparent conducting layer 17 and a metal layer 18.

An interlayer insulating film 19 is formed so as to substantially cover the surface of the transparent substrate 11 bearing the TFT 4, and the interlayer insulating film 19 is planarized. On the planarized surface of the interlayer insulating film 19, the transparent electrode 21 is formed, and on the transparent electrode 21, the metal layer 23 is formed. The transparent electrode 21 is electrically connected to the connection electrode 5 through a contact hole 6 formed in the interlayer insulating film 19, so as to be electrically connected to the drain electrode 16 through the connection electrode 5. The metal layer 23 is electrically connected to the drain electrode 16 through the transparent electrode 21.

Since the interlayer insulating film 19 is thus formed, the surface of the substrate 100A can be flat and the metal layer 23 can be insulated from the TFT 4 and the various lines formed below the interlayer insulating film 19. Therefore, the metal layer 23 can be formed above the TFT 4, the gate line 2, the source line 3 and the connection electrode 5, resulting in increasing the display area.

The active matrix substrate 100A described above is merely an example, and the structures of the TFT 4 and the connection electrode 5 can be appropriately modified. Also, any of known active matrix substrates can be applied as far as the surfaces of the transparent electrode region 20 and the reflection electrode region 22 facing the liquid crystal layer 24 are flat.

The transparent electrode region 20 and the reflection electrode region 22 of the active matrix substrate 100A are preferably entirely flat. However, there is a case that a step is formed, for example, above the contact hole 6. In this case, if the area of a region having a different thickness is 10% or less of the total area of the remaining region (for example, the total area of the reflection electrode region), such a step is allowable because degradation in the display quality caused by the step cannot be visually recognized.

The active matrix substrate 100A can be fabricated by a known method from known materials. Furthermore, an alignment layer (not shown) may be formed on the surface of the active matrix substrate 100A facing the liquid crystal layer 24 if necessary.

The counter substrate 100B of the liquid crystal display device 100 includes, as is shown in FIG. 1A, a transparent insulating substrate 9 of glass or the like, and a color filter layer 10 and the light diffusion layer 30 formed on the surface of the transparent insulating substrate 9 facing the liquid crystal layer 24. The counter substrate 100B further includes a single counter electrode (not shown) for applying a voltage to the liquid crystal layer 24 on substantially the entire surface thereof. The counter electrode is typically provided on the surface of the color filter layer 10 facing the liquid crystal layer 24. The color filter layer 10 typically includes color layers of red (R), green (G) and blue (B) and black matrixes disposed therebetween (none shown). The color filter layer 10 and the counter electrode (not shown) can be fabricated by a known method from known materials.

The light diffusion layer 30 is formed on substantially the entire surface of the counter substrate 100B. Specifically, the light diffusion layer 30 is formed not only in the reflection region Rf but also in the transmission region Tr of the counter substrate 100B.

A portion of the light diffusion layer 30 formed in the reflection region Rf diffuses ambient light entering the liquid crystal display device 100 so as to realize display in white close to paper white. Also, a portion of the light diffusion layer 30 formed in the transmission region Tr diffuses ambient light entering the liquid crystal display device 100 so as to suppress surface reflection in the transmission region Tr of the liquid crystal display device 100 and realize display free from unevenness and glare. Specifically, the portion of the light diffusion layer 30 formed in the transmission region Tr exhibits an anti-glare effect.

The light diffusion layer 30 may be selectively formed in the reflection region Rf alone as in the liquid crystal display device 100' shown in FIG. 1B. When the light diffusion layer 30 is thus formed, light transmitting the transmission region Tr is never diffused, resulting in improving optical efficiency. It may be appropriately selected depending upon the application of the liquid crystal display device whether or not the light diffusion layer 30 is formed in the transmission region Tr. The liquid crystal display device 100' is different from the aforementioned liquid crystal display device 100 merely in the light diffusion layer 30 formed in the reflection region Rf alone, and hence, the description of the remaining structure is omitted.

As described above, the parallax derived from the thickness of the transparent substrate 9 can be suppressed by providing the light diffusion layer 30 on the surface of the transparent substrate 9 facing the liquid crystal layer 24, so as to suppress blur of a displayed image.

The light diffusion layer 30 is preferably formed from a material obtained by dispersing, in a transparent matrix material (such as a resin of the acrylic family), a filler having a different refractive index from the matrix material. (Hereinafter, a light diffusion layer formed from such a material is designated as a "dispersion type light diffusion layer".) As compared with a light diffusion layer formed from a material obtained by roughening the surface of a thin film of a transparent material (such as an inorganic material like $SiO_2$) with a sandblaster or the like (hereinafter referred to as a "roughened light diffusion layer"), the dispersion type light diffusion layer is preferred because it can be easily formed in a uniform thickness and has a remarkable effect to suppress variation in the thickness of the liquid crystal layer 24. Furthermore, in the dispersion type light diffusion layer 30 with a flat surface, the ratio of forward scattering to back scattering can be larger than in the roughened light diffusion layer having an irregular surface. Therefore, white light (that is, a phenomenon that the diffusion layer is visually recognized as a bright object) derived from back scattering can be suppressed, resulting in realizing bright display with a high contrast ratio.

The matrix material and the filler used for forming the dispersion type light diffusion layer 30 are preferably colorless and transparent. The light diffusion layer 30 provided on the surface of the transparent substrate 9 facing the liquid crystal layer 24 is subjected to a heat treatment process and a chemical treatment process during the fabrication of the liquid crystal display device 100 or 100', and hence, the matrix material and the filler are preferably sufficiently stable against these processes. Specifically, the matrix material and the filler preferably have heat resistance against heat of 200° C. or more and stability against water, alkalescency and chemicals such as isopropyl alcohol (IPA).

As the matrix material for the dispersion type light diffusion layer 30, any of various polymers (such as resins of the polyester family, resins of the polyurethane family, epoxy resins, acrylic resins and amino resins) can be suitably used. In forming the light diffusion layer 30 selectively in the reflection region Rf as is shown in FIG. 1B, it is preferred from the viewpoint of productivity that the light diffusion layer 30 formed on the entire surface is patterned by photolithography, and that a material with photosensitivity and a development property (etching property) is used.

The filler may be an inorganic filler such as silica or an organic filler such as polyimide and polysulfone. Furthermore, the filler is preferably in the form of particles with an average particle size of 0.5 $\mu$m through 2.0 $\mu$m. When the average particle size is smaller than 0.5 $\mu$m, the light diffusing property may be spoiled, and when it exceeds 2.0 $\mu$m, the thickness of the light diffusion layer may be difficult to control or the surface flatness of the diffusion layer may be spoiled. The amount of the filler to be added depends also upon a difference in the refractive index from the matrix material and can be appropriately set so as to attain sufficient light diffusing property and light transmittance. When the amount is too large, although the light diffusing property of the light diffusion layer is improved, the light transmittance of the light diffusion layer itself is degraded. In order to realize sufficiently bright display, the transmittance (in a visible light region) of the light diffusion layer itself is preferably 90% or more. The thickness of the light diffusion layer is preferably in a range between 1 $\mu$m and 8 $\mu$m for attaining the sufficient light diffusing property. The aforementioned transmittance of the light diffusion layer is the transmittance of a light diffusion layer actually formed in this thickness. The transmittance is calculated as a percentage of a quantity of transmitted light, which is obtained by allowing perfect diffuse light to enter the light diffusion layer from the behind and receiving light having passed through the light diffusion layer in a normal line direction of the light diffusion layer at a collection angle of 2 degrees, to a quantity of incident light obtained without forming the light diffusion layer. The transmittance can be measured with, for example, a luminance meter BM7 manufactured by TOPCON.

The light diffusion layer 30 can be formed by any of known methods of forming a thin film. For example, it can be formed by applying, on the substrate, a solution obtained by dissolving and dispersing the filler in the polymer by spin coating (coating method), or by adhering a dry film of the resin in which the filler is dispersed onto the substrate (film adhering method).

The light diffusion layer 30 can be provided in any of various positions. Now, the possible positions of the light diffusion layer 30 will be described with reference to FIGS. 3A through 3C.

Figure 3A:
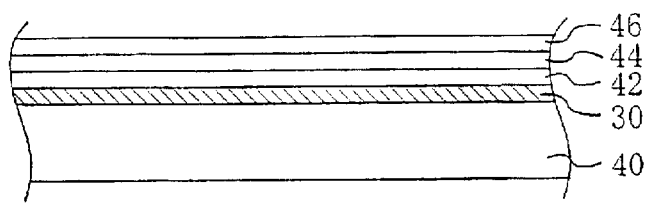
FIGS. 3A, 3B and 3C are schematic cross-sectional views for showing exemplified arrangement of a light diffusion layer 30 used in the liquid crystal display devices of Embodiment 1.
Figure 3B:
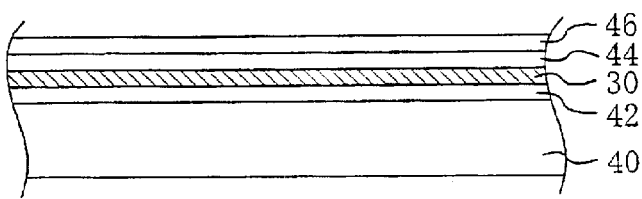
Figure 3C:
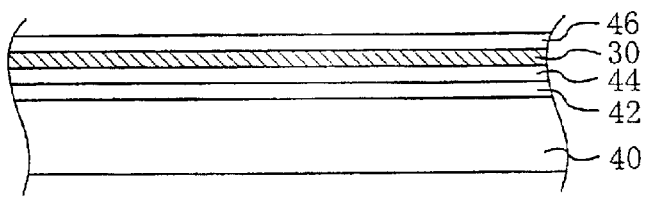

The light diffusion layer 30 may be provided between a transparent substrate 40 and a color filter layer 42 as shown in FIG. 3A, between the color filter layer 42 and a counter electrode 44 as shown in FIG. 3B, or between the counter electrode 44 and an alignment layer 46 as shown in FIG. 3C. Alternatively, in any of the three layered structures of FIGS. 3A through 3C, the color filter layer 42 and the counter electrode 44 can be replaced with each other.

Such a light diffusion layer 30 formed from the aforementioned dispersion type material can be easily formed to attain surface roughness (variation in thickness) $\frac{1}{10}$ as small as the thickness of the liquid crystal layer (for example, 0.15 $\mu$m or less). The thickness of the liquid crystal layer depends upon the display mode (namely, the kind of liquid crystal material) and is approximately 1.5 $\mu$m through 10 $\mu$m in general. Therefore, when such a dispersion type light diffusion layer is employed, a liquid crystal display device including a liquid crystal layer with a uniform thickness optimal to the display mode can be easily realized.

Furthermore, on the flat surface of the light diffusion layer 30 formed from the dispersion type material, scattering (back scattering) is minimally caused and light is effectively scattered (forward scattered) within the light diffusion layer 30. As a result, display with a high contrast ratio can be realized in the reflection mode. Also, in the arrangement shown in FIG. 3C, the light diffusion layer 30 can be used as an electric insulating layer. Specifically, the light diffusion layer 30 can be used as an overcoat layer formed between a driving electrode and an alignment layer in a STN liquid crystal display device or the like.

When the light diffusion layer 30 is disposed adjacent to (on or below) the color filter layer (typically having a thickness of 1 $\mu$m through 2 $\mu$m), substantially no parallax is caused between the color filter layer and the light diffusion layer, and hence, blur is never caused, resulting in realizing high quality display. Also, since there is no need to provide irregularities on the surface of a reflector plate, it is possible to suppress a phenomenon occurring in a conventional reflector plate having irregularities that interference between light reflected by the irregularities becomes conspicuous through an anti-glare film so as to be observed as uneven display.

Now, control of the thickness of the liquid crystal layer 24 (also designated as a "cell gap") in the liquid crystal display device 100 or 100' will be described.

A thickness dr of the liquid crystal layer 24 in the reflection region Rf of the liquid crystal display device 100 or 100' is set to be ½ of a thickness dt of the liquid crystal layer 24 in the transmission region Tr. Ambient light used for display in the reflection mode enters from above in FIG. 1A or 1B (through the counter substrate 100B or 100B'), passes through the liquid crystal layer 24, is reflected by the metal layer 23, passes through the liquid crystal layer 24 again and goes out through the counter substrate 100B or 100B', and thus passes the liquid crystal layer 24 twice. Accordingly, by setting the thickness dr of the liquid crystal layer 24 in the reflection region Rf to ½ of the thickness dt of the liquid crystal layer 24 in the transmission region Tr, the optical path length of light used for display in the reflection mode can accord with the optical path length of light used for display in the transmission mode. In a mode where the polarization direction is changed (rotated) by the liquid crystal layer 24 (such as the TN mode, the STN mode and the ECB mode including the vertical alignment mode), high quality display can be realized by making the polarization direction of light having passed through the reflection region Rf accord with the polarization direction of light having passed through the transmission region Tr in each pixel region Px.

In order to sufficiently satisfy the condition for the thicknesses of the liquid crystal layer 24, the thicknesses dt and dr of the liquid crystal layer 24 are preferably constant in the transmission region Tr and the reflection region Rf, respectively. The active matrix substrate 100A included in the present liquid crystal display device 100 or 100' has the flat surfaces facing the liquid crystal layer 24 in the transparent electrode region 20 and the reflection electrode region 22 as described above, and the light diffusion layer 30 provided on the counter substrate 100B or 100B' also has a flat surface facing the liquid crystal layer 24. Therefore, the thicknesses of the liquid crystal layer 24 are respectively constant in the transmission region Tr and the reflection region Rf, so as to realize high quality display.

Specifically, variation in the thickness of the liquid crystal layer 24 in the transmission region Tr and the reflection region Rf in the present liquid crystal display device 100 or 100' is as small as 0.03 through 0.05 in the standard deviation σ (obtained by measuring the thicknesses at 25 points on the plane). On the other hand, the variation in the thickness of the liquid crystal layer in the reflection region in the liquid crystal display device using the reflection electrode with an irregular surface disclosed in Japanese Laid-Open Patent Publication No. 11-101992 is as large as 0.12 through 0.15 in the standard deviation σ and sometimes exceeds 1/10 of the thickness of the liquid crystal layer. As is obvious from this fact, the transmission/reflection type liquid crystal display devices 100 and 100' of this invention can realize higher quality display than the conventional display device.

Figure 4A:
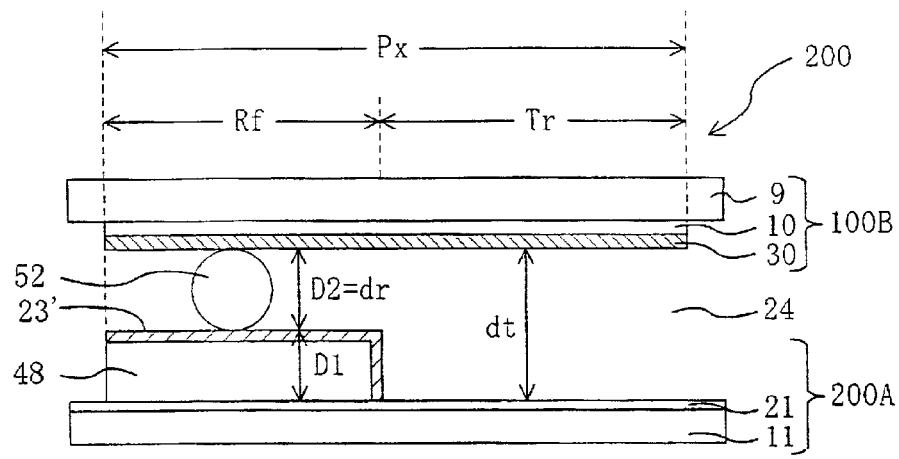
FIGS. 4A and 4B are schematic cross-sectional views of other liquid crystal display devices 200 and 200' according to Embodiment 1 of the invention, respectively.
Figure 4B:
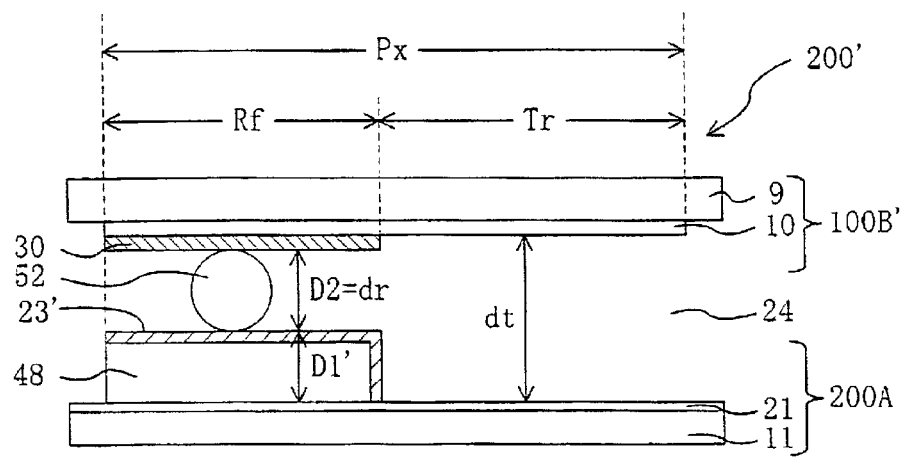

Now, a method of controlling the thickness (cell gap) of the liquid crystal layer 24 in a liquid crystal display device 200 and 200' according to this invention will be described with reference to FIGS. 4A and 4B.

The liquid crystal display devices 200 and 200' are respectively different from the liquid crystal display devices 100 and 100' in including an insulating film 48 and a metal layer 23' formed thereon instead of the metal layer 23 formed on the active matrix substrate 100A shown in FIGS. 1A and 1B. The other composing elements of the liquid crystal display devices 200 and 200' are substantially the same as those of the liquid crystal display devices 100 and 100', respectively, and hence, the description is omitted by using like reference numerals to refer to like elements.

In the case where the light diffusion layer 30 is formed on substantially the entire surface of the counter substrate 100B as in the liquid crystal display device 200 of FIG. 4A, as is shown in formula (1) below, the thickness dr (=D2) of the liquid crystal layer 24 in the reflection region Rf can be set to ½ of the thickness dt of the liquid crystal layer 24 in the transmission region Tr by equalizing the thickness (D1) of the insulating layer 48 to the diameter (D2) of a spacer 52. The thickness of the metal layer 23' is negligible because it is very thin as compared with the insulating layer 48.

$$D1+D2=dt(D1=D2=dr) \qquad (1)$$

On the other hand, in the case where the light diffusion layer 30 is selectively formed in the reflection region Rf alone as in the liquid crystal display device 200' of FIG. 4B, as is shown in formula (2) below, the thickness dr (=D2) of the liquid crystal layer 24 in the reflection region Rf can be set to ½ of the thickness dt of the liquid crystal layer 24 in the transmission region Tr by equalizing the diameter D2 of the spacer 52 to the sum of the thickness D1' of the insulating layer 48 and the thickness D3 of the light diffusion layer 30.

$$D1'+D2+D3=dt(D1'+D3=D2=dr) \qquad (2)$$

The aforementioned relationship is an optimal relationship in the design, and hence may not be satisfied in actual fabrication of a liquid crystal cell due to influence of processing accuracy. However, when the thickness dr of the liquid crystal layer 24 in the reflection region Rf and the thickness dt of the liquid crystal layer 24 in the transmission region Tr are shifted by 15% or less of the design values, the display quality can be improved as compared with that attained by the conventional display device.

Now, other examples of the structures of the light diffusion layer 30 and the reflection electrode region 22 usable in the liquid crystal display device of this embodiment will be described. The reflection electrode region 22 can be formed from a single metal layer 23 or formed from the insulating layer 48 and the metal layer 23' formed thereon as is exemplified in the liquid crystal display devices 100 and 200 of Embodiment 1. In these cases, the thickness of the liquid crystal layer 24 in the reflection region Rf can be adjusted by controlling the thicknesses of the metal layer 23 and the insulating layer 48, respectively. In the following description, the detailed structures of the transparent electrode region 20 and the reflection electrode region 22 are omitted for simplification. Also, in the drawings referred to in the following description, the same reference numerals are used to refer to elements having substantially the same functions as those of the aforementioned liquid crystal display devices of Embodiment 1 so as to omit the description.

Figure 5:
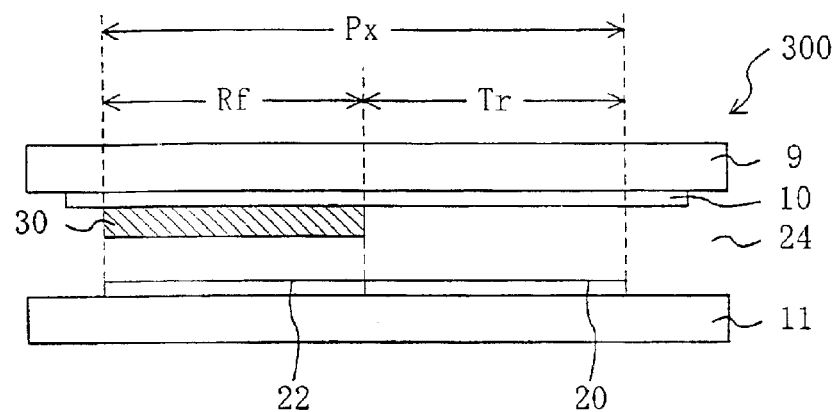
FIG. 5 is a schematic cross-sectional view of another liquid crystal display device 300 according to Embodiment 1 of the invention.

In a liquid crystal display device 300 of FIG. 5, the light diffusion layer 30 is selectively formed in the reflection region Rf alone as in the liquid crystal display device 100' of FIG. 1B, whereas the thickness of the liquid crystal layer 24 in the reflection region Rf is adjusted by controlling the thickness of the light diffusion layer 30. Since the light diffusion layer 30 is not formed in the transmission region Tr in the liquid crystal display device 300 as in the liquid crystal display device 100', optical loss caused through diffusion of light passing through the transmission region Tr can be avoided, so as to improve the optical efficiency.

Figure 6:
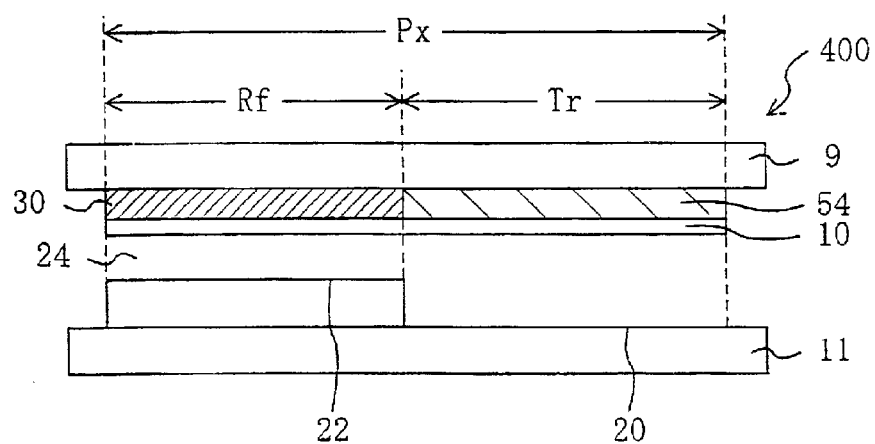
FIG. 6 is a schematic cross-sectional view of still another liquid crystal display device 400 according to Embodiment 1 of the invention.

A liquid crystal display device 400 of FIG. 6 includes the light diffusion layer 30 selectively formed in the reflection region Rf and a transparent layer 54 selectively formed in the transmission region Tr. The transparent layer 54 has the same thickness as the light diffusion layer 30 and has a flat surface. The color filter layer 10 is formed on the flat face formed by the light diffusion layer 30 and the transparent layer 54. The thickness of the liquid crystal layer 24 in the reflection region Rf is adjusted by controlling the thickness of the reflection electrode region 22. The transparent layer 54 may be formed from, for example, an acrylic resin or a polyimide resin similarly to the matrix material for the dispersion type light diffusion layer. This structure is advantageous because the thickness of the liquid crystal layer can be comparatively easily controlled owing to the flatness of the surface, facing the liquid crystal layer, of the substrate bearing the light diffusion layer (namely, the substrate closer to an observer).

Figure 7:
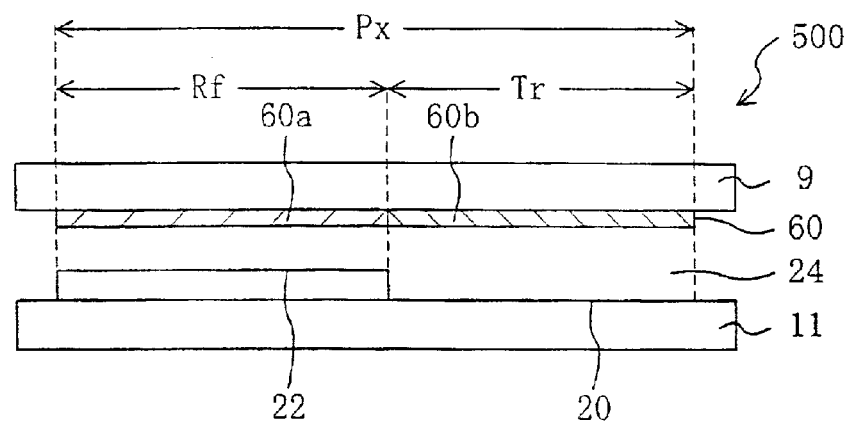
FIG. 7 is a schematic cross-sectional view of still another liquid crystal display device 500 according to Embodiment 1 of the invention.

A liquid crystal display device 500 of FIG. 7 includes a color filter layer 60 having a light diffusion color filter region 60a with a function to diffuse light and a general color filter region 60b. The light diffusion color filter region 60a is selectively provided correspondingly to the reflection region Rf. Since the light diffusing function is thus provided to a part of the color filter layer 60, the entire structure can be simplified. The light diffusion color filter region 60a can be formed from a material obtained by dispersing a filler having a different refractive index in a material for forming the general color filter layer. For example, when a color filter layer with a thickness of approximately 1.7 μm is formed from a dispersion type material obtained by adding 30 wt % of a filler in the form of particles (such as silica) with a particle size of 1 μm to a general material for a color filter layer, the light diffusion color filter region 60a can be formed. The light diffusion color filter region 60a has surface smoothness and thickness uniformity equivalent to those of the color filter region 60b where no filler is dispersed.

Figure 8:
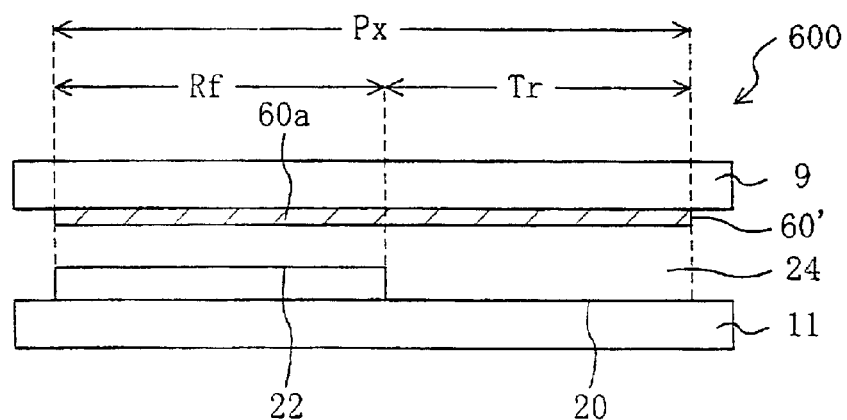
FIG. 8 is a schematic cross-sectional view of still another liquid crystal display device 600 according to Embodiment 1 of the invention.

Needless to say, a color filter layer 60' including the light diffusion color filter region 60a on substantially the entire surface can be provided on the counter substrate as in a liquid crystal display device 600 of FIG. 8. It is appropriately determined depending upon the application of the liquid crystal display device whether the light diffusion color filter region 60a is selectively formed in the reflection region Rf alone or formed on the entire surface similarly to the determination regarding the light diffusion layer 30.

Figure 9:
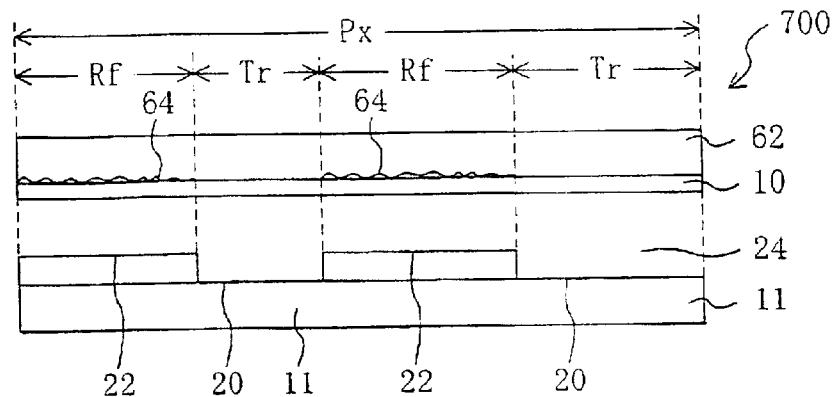
FIG. 9 is a schematic cross-sectional view of still another liquid crystal display device 700 according to Embodiment 1 of the invention.

In a liquid crystal display device 700 of FIG. 9, a glass substrate 62 of the counter substrate has an irregular surface (light diffusion layer) 64. Random irregularities are selectively formed in a portion corresponding to the reflection region Rf on the surface of the glass substrate (for example, #1737; manufactured by Corning Inc.). The random irregularities can be formed by, for example, sandblast. The irregularities formed by the sandblast have a size on the plane (that can be approximated to the diameter) of approximately 2 through 5 μm, and a depth of approximately 0.5 through 1 μm, and their centers are randomly distributed on the plane. Furthermore, when a planarizing film (of, for example, $SiO_2$) having a refractive index different from the glass substrate 62 is formed on the glass substrate 62 having the irregular surface, the ability to diffuse light can be improved. In such a structure, the irregular surface of the glass substrate 62 or the combination of the irregular surface and the planarizing film (not shown) functions as the light diffusion layer. Although the light diffusion layer 64 is selectively formed in the reflection region Rf in FIG. 9, the light diffusion layer 64 may be formed on substantially the entire surface of the substrate as in the aforementioned structures. Furthermore, the glass substrate 62 may be replaced with a plastic substrate.

Figure 10:
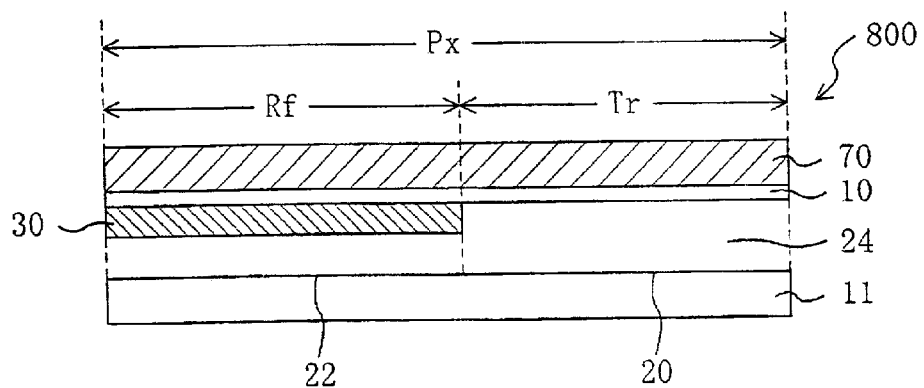
FIG. 10 is a schematic cross-sectional view of still another liquid crystal display device 800 according to Embodiment 1 of the invention.

Moreover, when a plastic substrate 70 with a polarization function is used as in a liquid crystal display device 800 of FIG. 10, the polarizing plate (not shown) on the side of the counter substrate can be omitted so as to simplify the structure. The plastic substrate 70 occasionally has retardation derived from its fabrication method, and hence, the retardation (phase difference) of the plastic substrate is preferably as small as possible from the viewpoint of the contrast ratio. The liquid crystal display device 800 has the same structure as the liquid crystal display device 100 of Embodiment 1 except for the plastic substrate 70 with the polarization function. The plastic substrate 70 with the polarization function may be used in any of the aforementioned liquid crystal display devices.

Figure 11:
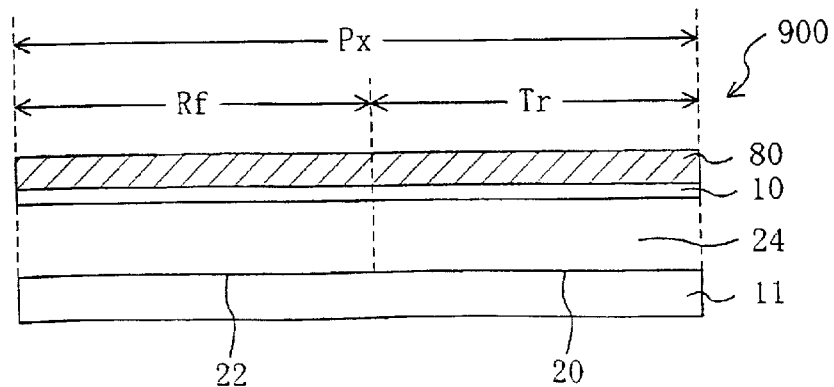
FIG. 11 is a schematic cross-sectional view of still another liquid crystal display device 900 according to Embodiment 1 of the invention.

A transparent insulating substrate used in the counter substrate may have a light diffusing function as in a liquid crystal display device 900 of FIG. 11. A plastic substrate 80 of the liquid crystal display device 900 is formed from a polymer material where a filler is dispersed and has a light diffusing function. The plastic substrate 800 is formed from, for example, a material obtained by dispersing 15 through 20 wt % of a silica filler in the form of particles (with an average particle size of 1 μm) in PET or PES (a matrix material).

In each of the liquid crystal display devices of FIGS. 7 through 9 and 11, there is no need to separately form a light diffusion layer. Therefore, they have advantages that the fabrication process can be simplified (namely, the fabrication cost can be reduced) and that the thickness can be further reduced in addition to the above-described advantages of the liquid crystal display devices of this embodiment. Also, when the plastic substrate with the polarization function is used as in the liquid crystal display device 800 of FIG. 10, one polarizing plate can be omitted, so as to further simplify the fabrication process and further reduce the thickness of the liquid crystal display device.

Embodiment 2

A liquid crystal display device according to Embodiment 2 is different from the liquid crystal display devices of Embodiment 1 in including a light diffusion layer disposed on the outside of a second substrate (a side closer to an observer) opposing a first substrate (closer to a back light) with a liquid crystal layer sandwiched therebetween. In drawings showing liquid crystal display devices of Embodiment 2, the same reference numerals are used to refer to elements substantially having the same functions as those used in the liquid crystal display devices of Embodiment 1 so as to omit the description.

Figure 12A:
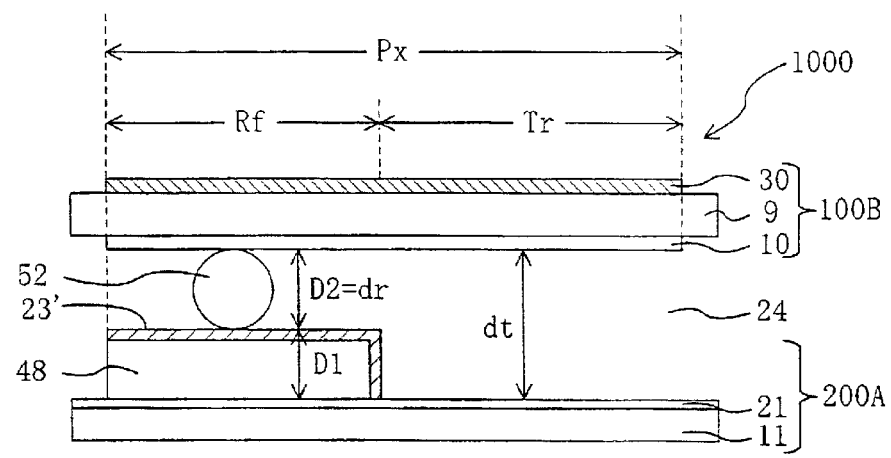
FIGS. 12A and 12B are schematic cross-sectional views of liquid crystal display devices 1000 and 1000' according to Embodiment 2 of the invention, respectively.
Figure 12B:
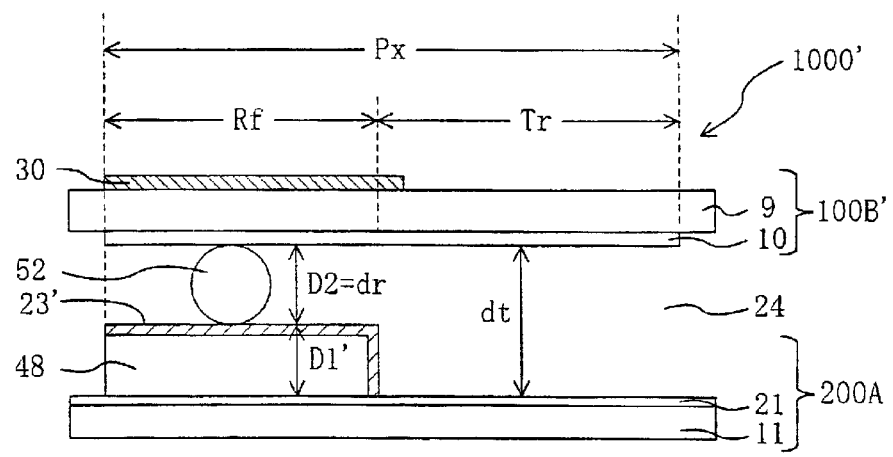

FIGS. 12A and 12B respectively show the schematic sectional structures of the liquid crystal display devices 1000 and 1000' of Embodiment 2. The liquid crystal display devices 1000 and 1000 of FIGS. 12A and 12B are respectively different from the liquid crystal display devices 200 and 200' of FIGS. 4A and 4B in disposing the light diffusion layer 30 on the outside (a side closer to an observer) of the transparent substrate 9.

When the light diffusion layer 30 is selectively formed correspondingly to the reflection region Rf on the outside of the transparent substrate 9 as is shown in FIG. 12B, the light diffusion layer 30 is preferably slightly larger than the reflection region Rf. Specifically, the area of the light diffusion layer 30 is preferably increased in accordance with a distance between the light diffusion layer 30 and a metal layer (reflection layer) 23' increased by a dimension corresponding to the thickness of the transparent substrate 9 (of, for example, 0.7 mm), so as to allow most of light obliquely entering the metal layer 23' or most of light obliquely going out from the metal layer 23' to pass through the light diffusion layer 30. The area of the light diffusion layer 30 provided correspondingly to the reflection region Rf can be appropriately set also in consideration of the liquid crystal display mode and the like.

The liquid crystal display devices 1000 and 1000' are more advantageous than the liquid crystal display devices 200 and 200' of Embodiment 1 each including the light diffusion layer 30 on the inside of the transparent substrate 9 in easiness in the fabrication, applicability to design change or common use of the light diffusion layer and low fabrication cost. Specifically, the light diffusion layer 30 is formed on the outside of the transparent substrate 9 after adhesion of the substrates 100A and 100B and injection of a liquid crystal, and therefore, the yield can be avoided from lowering due to the formation of the light diffusion layer 30. Also, although the light diffusion layer 30 may be formed by any of various methods as in Embodiment 1, it is preferable to use the light diffusion layer 30 formed from a film. The film for forming the light diffusion layer can be commonly used among liquid crystal display devices of various types (for example, having different panel sizes), and the film can be used flexibly in case of a change in the design of the liquid crystal display device.

Figure 13:
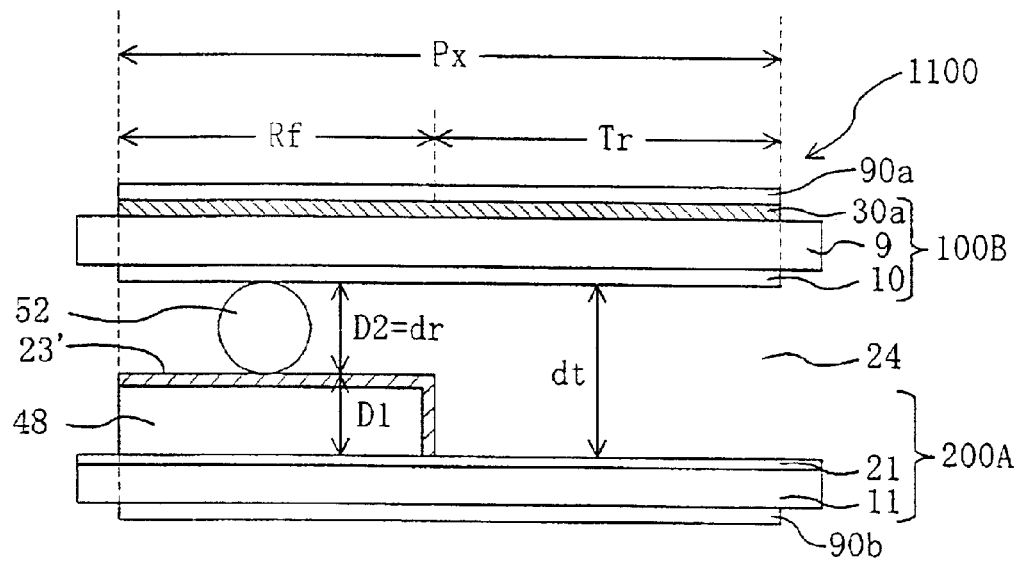
FIG. 13 is a schematic cross-sectional view of another liquid crystal display device 1100 according to Embodiment 2 of the invention.

The effect to simplify the fabrication (namely, the effect to decrease the cost) is more remarkable in the structure where the light diffusion layer 30 is formed on the entire display region as in the liquid crystal display device 1000 than in the structure where the light diffusion layer 30 is selectively formed as in the liquid crystal display device 1000'. In particular, in a liquid crystal display device 1100 of FIG. 13 including a pair of polarizing plates 90a and 90b, when a material having a light diffusing function is used an adhesive for adhering the polarizing plate 90a onto the outside of the transparent substrate 9, a light diffusion layer 30a can be used also as the adhesive layer, resulting in further simplifying the fabrication process. Furthermore, also for the purpose of suppressing blur of a displayed image, the light diffusion layer 30 is preferably adjacent to the transparent substrate 9. Therefore, also from the viewpoint of suppressing blur of a displayed image, the light diffusion layer 30a is effectively used as the adhesive layer between the polarizing plate 90a and the transparent substrate 9.

As the material for the light diffusion layer also serving as the adhesive, a dispersion type material obtained by adding a filler to any of various resin adhesives (working as a matrix material) can be suitably used. Examples of the resin adhesives are adhesives of the phenol family, the acrylic family, the polyimide family, the epoxy family and the silicon family. As the filler, any of the fillers for the dispersion type light diffusion layer described in Embodiment 1 can be widely used.

Figure 14:
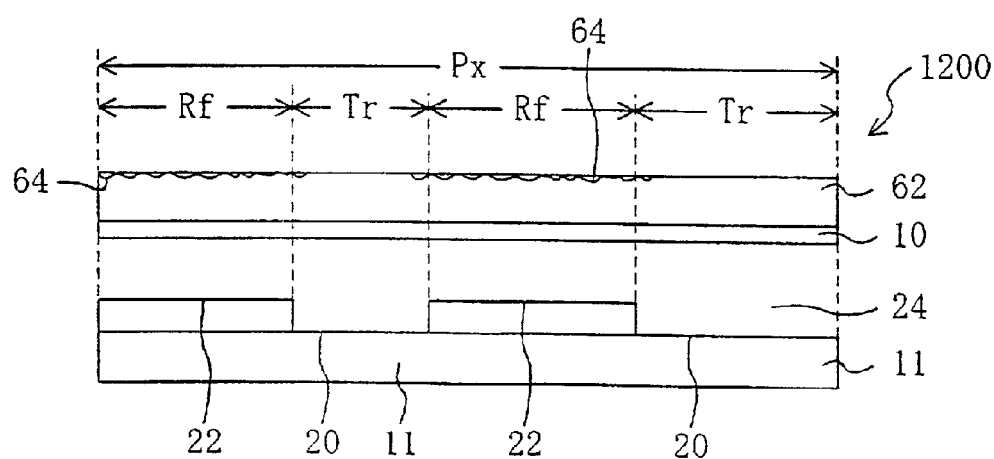
FIG. 14 is a schematic cross-sectional view of still another liquid crystal display device 1200 according to Embodiment 2 of the invention.

FIG. 14 is a schematic sectional view of another liquid crystal display device 1200 of this embodiment. In the liquid crystal display device 1200, the light diffusion layer 64 (irregular surface) of the liquid crystal display device 700 of FIG. 9 described in Embodiment 1 is formed on the outside of a glass substrate 62. The liquid crystal display device 1200 can be fabricated by substantially the same method as the liquid crystal display device 700.

In the structure where the light diffusion layer 64 is selectively formed correspondingly to the reflection region Rf as is shown in FIG. 14, the light diffusion layer 64 is preferably larger than the reflection region Rf similarly to the light diffusion layer 30 of the liquid crystal display device 1000' of FIG. 12B.

Furthermore, the ability to diffuse light can be improved when a planarizing film (of, for example, $SiO_2$) having a different refractive index from the glass substrate 62 is formed on the glass substrate 62 having the irregular surface. In such a structure, the irregular surface of the glass substrate 62 or the combination of the irregular surface and the planarizing film (not shown) functions as the light diffusion layer. In the structure where a polarizing plate is disposed on the outside of the glass substrate 62, when a transparent material having a different refractive index from the glass substrate 62 is used as a material for an adhesive layer for adhering the polarizing plate (not shown) onto the outside of the glass substrate 62, the adhesive layer can function as the planarizing film.

Although the light diffusion layer 64 is selectively formed correspondingly to the reflection region Rf in FIG. 14, the light diffusion layer 64 can be formed on substantially the entire surface of the substrate as in the aforementioned structures. Also, the glass substrate 62 can be replaced with a plastic substrate.

Embodiment 3

A liquid crystal display device according to Embodiment 3 is similar to the liquid crystal display devices of Embodiment 2 in disposing a light diffusion layer on the outside (a side closer to an observer) of a second substrate (closer to the observer), but is different in further including an anti-glare layer on the outside of the second substrate. In drawings showing liquid crystal display devices of Embodiment 3, the same reference numerals are used to refer to elements having substantially the same functions as those of the liquid crystal display devices of Embodiment 1 and 2 so as to omit the description. Also, detailed description of the structures of the transparent electrode region 20 and the reflection electrode region 22 is omitted for simplification.

Figure 15:
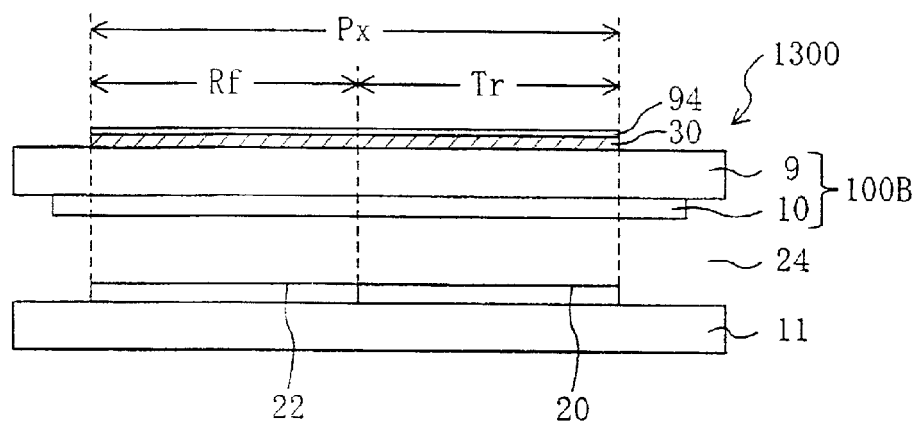
FIG. 15 is a schematic cross-sectional view of a liquid crystal display device 1300 according to Embodiment 3 of the invention.

FIG. 15 is a schematic sectional view of a liquid crystal display device 1300 of Embodiment 3. The liquid crystal display device 1300 of FIG. 15 is obtained by providing an anti-glare layer 94 on the surface closer to an observer of the liquid crystal display device 1000 of FIG. 12A.

The anti-glare layer 94 formed on the surface closer to an observer of the liquid crystal display device 1300 of Embodiment 3 is formed from a transparent material and has irregularities on its surface. The anti-glare layer 94 diffusedly reflects (scatters) ambient light mainly entering from the side closer to the observer. As a result, mirror reflection (direct reflection) of ambient light on the surface closer to the observer of the liquid crystal display device 1300 can be suppressed, so as to realize display with good visibility free from reflection of ambient images.

The anti-glare layer 94 is formed from, for example, AGS1 or AG30 manufactured by Nitto Denko Corporation. The optical characteristic of the anti-glare layer 94 is set in accordance with a desired anti-glare effect, and the pitch of the irregularities (average distance between the irregularities) of the anti-glare layer 94 is distributed to some extent within a range between approximately 30 $\mu$m and approximately 150 $\mu$m. For example, the pitches of the irregularities of the aforementioned products of Nitto Denko Corporation are distributed between approximately 47 $\mu$m and approximately 52 $\mu$m in AGS1 and between approximately 95 $\mu$m and approximately 140 $\mu$m in AG30.

In the case where the aforementioned anti-glare layer for realizing good display is provided in a liquid crystal display device having a conventional structure, in particular, in a liquid crystal display device having a pixel pitch (either the lateral pitch or longitudinal pitch) of approximately 120 $\mu$m or less, the display is sometimes uneven. Since such display failure is more conspicuous as ambient light is more intense, the display quality is lower in use in the open air in fine weather.

The present inventors have found that the display failure derives from moiré caused between the anti-glare layer having the irregularities and plural pixel regions arranged in a matrix. Moiré occurs due to light interference caused when plural periodic structures are overlapped.

The display failure is caused in both a transmission type liquid crystal display device and a reflection type liquid crystal display device, but is more conspicuous in a transmission/reflection type liquid crystal display device having a transmission region for the transmission mode display and a reflection region for the reflection mode display in each pixel region. The reason is as follows:

In a transmission/reflection type liquid crystal display device, each pixel region includes a transmission region and a reflection region, and hence, not only plural pixel regions are arranged in a periodic pattern but also plural transmission regions and plural reflection regions are also respectively arranged in periodic patterns. Accordingly, moiré is caused by the irregularities of the anti-glare layer, the pixel regions, the transmission regions and the reflection regions, resulting in causing conspicuous display failure. The display failure is more conspicuous when a difference between the pitch of the irregularities of the anti-glare layer and the pitch of the periodic structure is smaller.

In the liquid crystal display device 1300 of this embodiment, the counter substrate 100B includes the light diffusion layer 30, and hence, paper white display can be realized as in the liquid crystal display devices of Embodiments 1 and 2. Furthermore, the light diffusion layer 30 suppresses the occurrence of the above-described moiré, so that the display can be free from unevenness.

Specifically, since the light diffusion layer 30 is provided on the counter substrate 100B in the liquid crystal display device 1300, both light entering from the back light and passing through the transmission region Tr and light entering from the side closer to an observer, reflected by the reflection electrode region 22 and passing through the reflection region Rf pass through the light diffusion layer 30 so as to be diffused by the light diffusion layer 30 before going out toward the observer. Accordingly, moiré caused between the irregularities of the anti-glare layer 94 and the pixel regions Px, moiré caused between the irregularities of the anti-glare layer 94 and the transmission regions Tr and moiré caused between the irregularities of the anti-glare layer 94 and the reflection regions Rf are all suppressed, resulting in realizing display free from unevenness.

The effect to suppress the occurrence of moiré is more remarkable in the structure where the light diffusion layer 30 is provided on the outside (a side closer to an observer) of the counter substrate 100B as in the liquid crystal display device 1300 of FIG. 15 than in the structure where the light diffusion layer 30 is provided on the inside (a side closer to the liquid crystal layer) of the counter substrate 100B. Furthermore, the light diffusion layer 30 is formed preferably on the entire surface of the counter substrate 100B for suppressing the occurrence of moiré.

Figure 16:
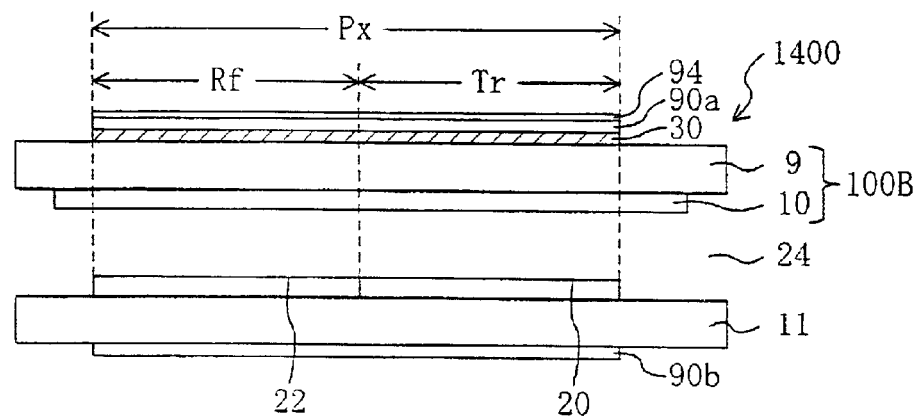
FIG. 16 is a schematic cross-sectional view of another liquid crystal display device 1400 according to Embodiment 3 of the invention.

Moreover, in a liquid crystal display device 1400 of FIG. 16 including a pair of polarizing plates 90a and 90b, in order to suppress blur of a displayed image, the light diffusion layer 30 is preferably provided between the polarizing plate 90a disposed on the outside of the transparent substrate 9 and the transparent substrate 9. In addition, from the viewpoint of simplification of the fabrication process, the light diffusion layer 30 preferably also serves as an adhesive layer for adhering the polarizing plate 90a to the transparent substrate 9.

Also in any of the liquid crystal display devices of this embodiment, the arrangement of the transmission region Tr and the reflection region Rf in the pixel region Px can be appropriately set in accordance with the specification of the liquid crystal display device. Now, examples of the arrangement of the transmission region Tr and the reflection region Rf and periodic structures causing the moiré in the exemplified arrangement will be described.

Figure 17:
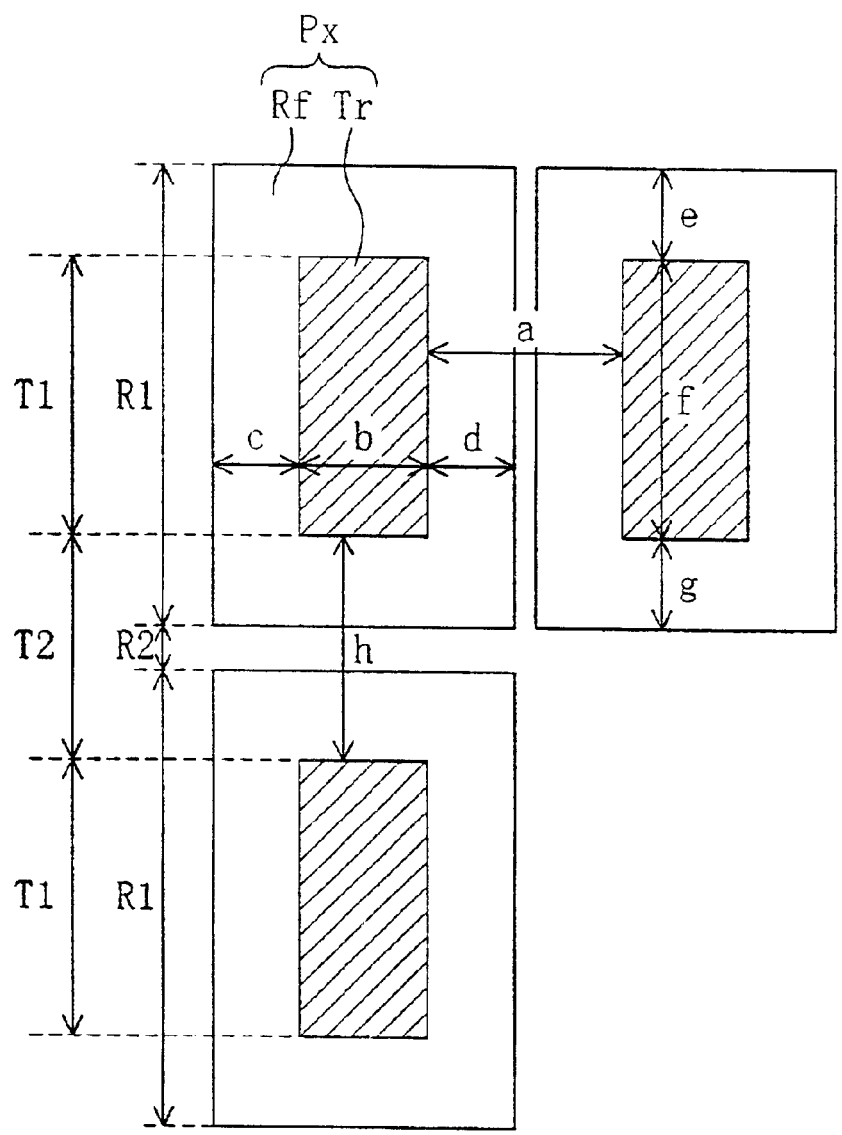
FIG. 17 is a top view for schematically showing arrangement of a transmission region Tr and a reflection region Rf in a pixel region Px of the liquid crystal display device 1300 or 1400 of Embodiment 3.

First, as is shown in FIG. 17, the transmission region Tr may be provided at the center of the pixel region Px with the reflection region Rf surrounding the transmission region Tr. In this arrangement, along the longitudinal (lengthwise) direction of the pixel regions Px, there are a periodic structure where the pixel regions Px are arranged in a predetermined pixel pitch, a periodic structure where the transmission regions Tr each having a predetermined width $T_1$ are arranged at a predetermined interval $T_2$, and a periodic structure where the reflection regions Rf each having a predetermined width $R_1$ are arranged at a predetermined interval $R_2$. Also, along the lateral (widthwise) direction of the pixel regions Px, there are similar plural periodic structures. Table 1 below shows exemplified values of dimensions indicated with reference characters a through h in FIG. 17. The values listed in Table 1 are values in a 2-inch type liquid crystal panel where the area ratio between the reflection region Rf and the transmission region Tr is 9:1.

TABLE 1

| | a | b | c | d | e | f | g | h |
|---|---|---|---|---|---|---|---|---|
| Width (μm) | 68 | 31 | 28 | 28 | 68 | 45 | 59 | 138 |

Figure 18:
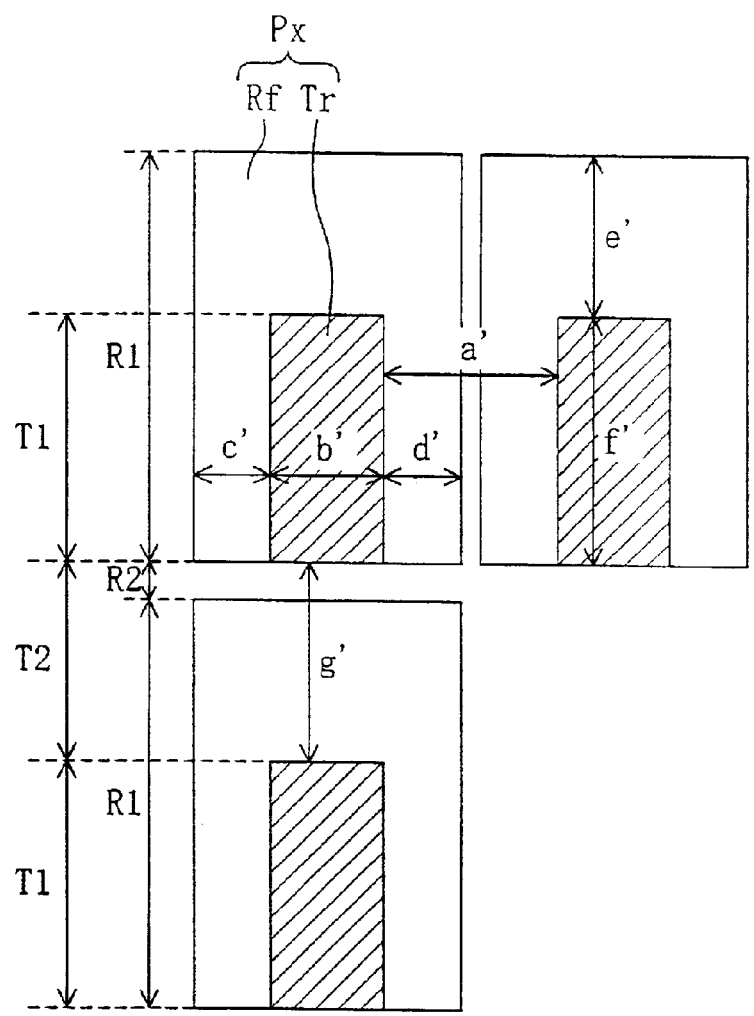
FIG. 18 is a top view for schematically showing another arrangement of the transmission region Tr and the reflection region Rf in the pixel region Px of the liquid crystal display device 1300 or 1400 of Embodiment 3.

Alternatively, as is shown in FIG. 18, the transmission region Tr may be provided with its one side defining its outline overlapping one side of the pixel region Px defining its outline, with the reflection region Rf provided in a U-shape surrounding the transmission region Tr. Also in this arrangement, there are plural periodic structures respectively along the longitudinal and lateral directions of the pixel regions Px. Table 2 shows exemplified values of dimensions indicated with reference characters a' through g' in FIG. 18. The values listed in Table 2 are values in a 2-inch type liquid crystal panel where the area ratio between the reflection region Rf and the transmission region Tr is 6:4 or 8:2.

TABLE 2

| | a' | b' | c' | d' | e' | f' | g' |
|---|---|---|---|---|---|---|---|
| In the case where the area ratio is 6:4: | | | | | | | |
| Width (μm) | 53 | 44 | 24 | 24 | 50 | 112 | 71 |
| In the case where the area ratio is 8:2: | | | | | | | |
| Width (μm) | 62 | 51 | 27 | 27 | 146 | 135 | 188 |

Figure 19:
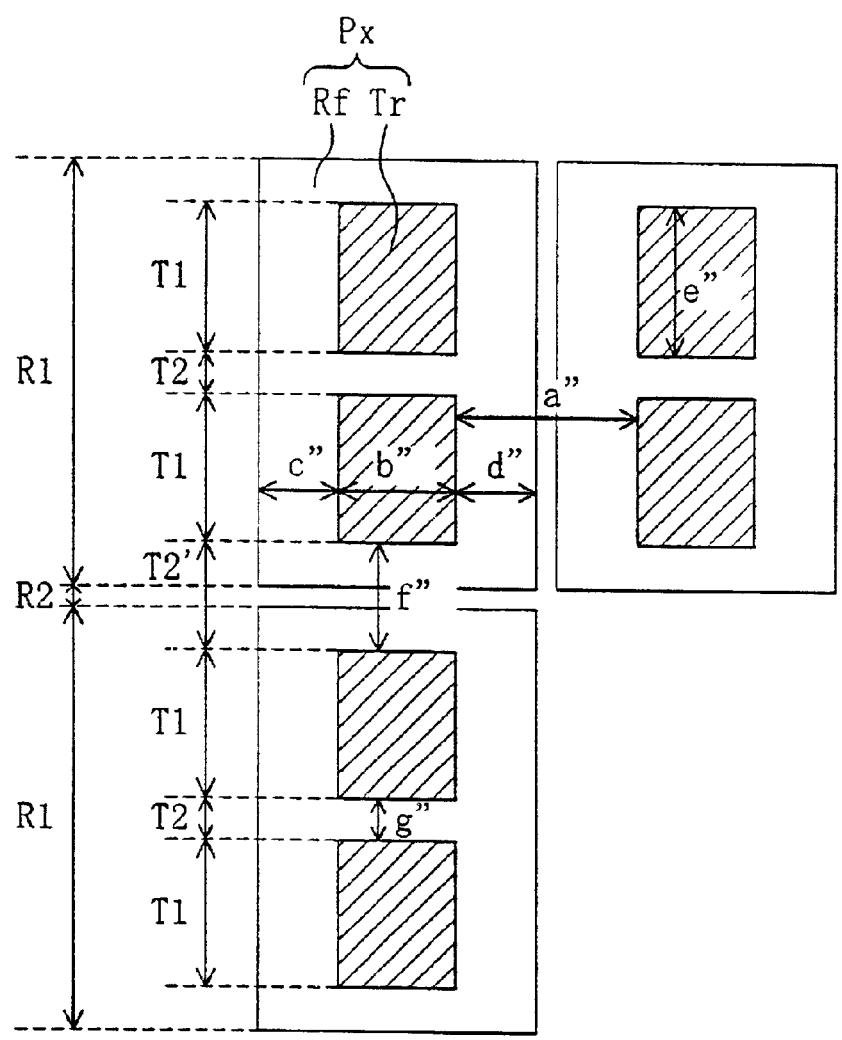
FIG. 19 is a top view for schematically showing still another arrangement of the transmission region Tr and the reflection region Rf in the pixel region Px of the liquid crystal display device 1300 or 1400 of Embodiment 3.

Alternatively, plural transmission regions Tr may be formed within each pixel region Px as is shown in FIG. 19. In this case, along the longitudinal direction of the pixel regions Px, there are a periodic structure where the pixel regions Px are arranged in a predetermined pixel pitch, a periodic structure where the transmission regions Tr each having a predetermined width $T_1$ are arranged at predetermined intervals $T_2$ and $T_2'$ alternately, and a periodic structure where the reflection regions Rf each having a predetermined width $R_1$ are arranged at a predetermined interval $R_2$. Also, along the lateral direction of the pixel regions Px, there are plural periodic structures. Table 3 shows exemplified values of dimensions indicated with reference characters a" through g" in FIG. 19. The values listed in Table 3 are values in a 3.5-inch type liquid crystal panel where the area ratio between the reflection region Rf and the transmission region Tr is 3:7, 5:5 or 8:2.

TABLE 3

| | a" | b" | c" | d" | e" | f" | g" |
|---|---|---|---|---|---|---|---|
| In the case where the area ratio is 3:7: | | | | | | | |
| Width (μm) | 34 | 80 | 14 | 14 | 115 | 50 | 40 |
| In the case where the area ratio is 5:5: | | | | | | | |
| Width (μm) | 59 | 55 | 26 | 26 | 114 | 49 | 40 |
| In the case where the area ratio is 8:2 | | | | | | | |
| Width (μm) | 85 | 28 | 39 | 39 | 114 | 50 | 40 |

In the liquid crystal display devices 1300 and 1400 of this embodiment, moiré caused between the plural periodic structures as exemplified above and the periodic structure of the irregularities of the anti-glare layer 94 can be suppressed, resulting in realizing display free from unevenness.

The combination of an active matrix substrate and a counter substrate can be appropriately selected among those included in the liquid crystal display devices described in the embodiments. Furthermore, active matrix liquid crystal display devices using TFTs (thin film transistors) are described in the embodiments, which does not limit the invention. The invention is applicable to any other liquid crystal display device such as an active matrix liquid crystal display device using MIM elements and a passive matrix liquid crystal display device.

What is claimed is:

1. A liquid crystal display device comprising:
   a first substrate;
   a second substrate;
   a liquid crystal layer disposed between the first substrate and the second substrate; and
   a plurality of pixel regions for display,
   wherein each of the plurality of pixel regions includes a transmission region for display in a transmission mode using light entering through the first substrate and a reflection region for display in a reflection mode using light entering through the second substrate,
   the first substrate includes, on a surface thereof facing the liquid crystal layer, a transparent electrode region defining the transmission region and a reflection electrode region defining the reflection region, each surface facing the liquid crystal layer of the transparent electrode region and the reflection electrode region of the first substrate being flat,
   the second substrate includes a light diffusion layer in the reflection region and includes, on a surface thereof facing the liquid crystal layer, a transparent electrode in the reflection region and the transmission region, the surface thereof facing the liquid crystal layer being flat in the transmission region and the reflection region, and
   wherein the second substrate includes the light diffusion layer in the reflection region alone.

2. The liquid crystal display device of claim 1, wherein the second substrate includes a transparent substrate, and the light diffusion layer is provided on a surface of the transparent substrate facing the liquid crystal layer.

3. The liquid crystal display device of claim 1, wherein the second substrate includes a transparent substrate, and the light diffusion layer is formed on a surface of the transparent substrate closer to an observer.

4. The liquid crystal display device of claim 3, further comprising a polarizing plate provided on a surface of the second substrate closer to an observer, wherein the light diffusion layer is provided between the transparent substrate and the polarizing plate.

5. The liquid crystal display device of claim 4, wherein the light diffusion layer functions as an adhesive layer for adhering the transparent substrate and the polarizing plate to each other.

6. The liquid crystal display device of claim 1, wherein the light diffusion layer contains a matrix material and particles having a refractive index different from that of the matrix material.

7. The liquid crystal display device of claim 1, wherein the second substrate includes a transparent substrate and a color filter layer, and the color filter layer functions also as the light diffusion layer.

8. The liquid crystal display device of claim 1, wherein the second substrate includes a plastic substrate, the plastic substrate contains a matrix material and particles having a refractive index different from that of the matrix material, and the plastic substrate functions also as the light diffusion layer.

9. The liquid crystal display device of claim 1, wherein a thickness of the liquid crystal layer in the reflection region is about ½ of a thickness of the liquid crystal layer in the transmission region.

10. The liquid crystal display device of claim 1, further comprising an anti-glare layer provided on a surface of the second substrate closer to an observer.

11. The liquid crystal display device of claim 10, wherein the second substrate includes a transparent substrate, and the light diffusion layer is provided between the transparent substrate and the anti-glare layer.

12. The liquid crystal display device of claim 11, further comprising a polarizing plate between the transparent substrate and the anti-glare layer, wherein the light diffusion layer is provided between the transparent substrate and the polarizing plate.

13. A liquid crystal display device comprising:
   a first substrate;
   a second substrate;
   a liquid crystal layer disposed between the first substrate and the second substrate; and
   a plurality of pixel regions for display,
   wherein at least one of the pixel regions includes a transmission region for display in a transmission mode using light entering through the first substrate and a reflection region for display in a reflection mode using light entering through the second substrate,
   the first substrate includes, on a surface thereof facing the liquid crystal layer, a transparent electrode region, and a reflection electrode region, each surface facing the liquid crystal layer of the transparent electrode region and the reflection electrode region of the first substrate being flat,
   the second substrate includes a light diffusion layer in the reflection region and includes, on a surface thereof facing the liquid crystal layer, a transparent electrode in the reflection region and the transmission region, the surface thereof facing the liquid crystal layer being flat in the transmission region and the reflection region, and
   wherein a thickness of the liquid crystal layer in the reflection region is about ½ of a thickness of the liquid crystal layer in the transmission region.

14. The liquid crystal display device of claim 13, wherein the second substrate includes the light diffusion layer in the transmission region.

15. The liquid crystal display device of claim 13, wherein the second substrate includes a transparent substrate, and the light diffusion layer is provided on a surface of the transparent substrate facing the liquid crystal layer.

16. The liquid crystal display device of claim 13, wherein the second substrate includes a transparent substrate, and the light diffusion layer is formed on a surface of the transparent substrate closer to an observer.

17. The liquid crystal display device of claim 16, further comprising a polarizing plate provided on a surface of the second substrate closer to an observer, wherein the light diffusion layer is provided between the transparent substrate and the polarizing plate.

18. The liquid crystal display device of claim 17, wherein the light diffusion layer functions as an adhesive layer for adhering the transparent substrate and the polarizing plate to each other.

19. The liquid crystal display device of claim 13, wherein the light diffusion layer contains a matrix material and particles having a refractive index different from that of the matrix material.

20. The liquid crystal display device of claim 13, wherein the second substrate includes a transparent substrate and a color filter layer, and the color filter layer functions also as the light diffusion layer.

21. The liquid crystal display device of claim 13, wherein the second substrate includes a plastic substrate, the plastic substrate contains a matrix material and particles having a refractive index different from that of the matrix material, and the plastic substrate functions also as the light diffusion layer.

22. The liquid crystal display device of claim 13, further comprising an anti-glare layer provided on a surface of the second substrate closer to an observer.

23. The liquid crystal display device of claim 22, wherein the second substrate includes a transparent substrate, and the light diffusion layer is provided between the transparent substrate and the anti-glare layer.

24. The liquid crystal display device of claim 23, further comprising a polarizing plate between the transparent substrate and the anti-glare layer, wherein the light diffusion layer is provided between the transparent substrate and the polarizing plate.

25. A liquid crystal display device comprising:

a first substrate;

a second substrate;

a liquid crystal layer disposed between the first substrate and the second substrate; and a plurality of pixel regions for display, wherein at least one of the pixel regions includes a transmission region for display in a transmission mode using light entering through the first substrate and a reflection region for display in a reflection mode using light entering through the second substrate, the first substrate includes, on a surface thereof facing the liquid crystal layer, a transparent electrode region, and a reflection electrode region defining the reflection region, each surface facing the liquid crystal layer of the transparent electrode region and the reflection electrode region of the first substrate being flat, the second substrate includes a light diffusion layer in the reflection region and includes, on a surface thereof facing the liquid crystal layer, a transparent electrode in the reflection region and the transmission region, the surface thereof facing the liquid crystal layer being flat in the transmission region and the reflection region, and wherein the second substrate includes the light diffusion layer in the reflection region alone.

* * * * *

UNITED STATES PATENT AND TRADEMARK OFFICE
CERTIFICATE OF CORRECTION

PATENT NO. : 6,894,745 B2
DATED : May 17, 2005
INVENTOR(S) : Fujimori et al.

It is certified that error appears in the above-identified patent and that said Letters Patent is hereby corrected as shown below:

Title page,
Item [56], References Cited, U.S. PATENT DOCUMENTS, add the following reference:
-- 5,724,111    3/1998    MIZOBATA et al. --.

Signed and Sealed this

Twenty-seventh Day of December, 2005

JON W. DUDAS
*Director of the United States Patent and Trademark Office*